Figure 2:
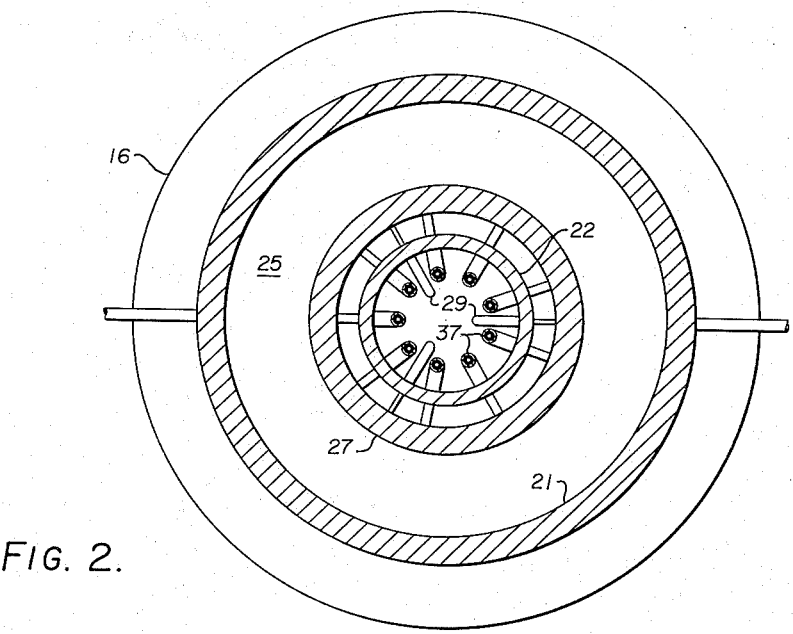

Aug. 22, 1961   W. R. BAKER ET AL   2,997,641
PLASMA GENERATOR DEVICE
Filed May 20, 1958

INVENTORS.
WILLIAM R. BAKER
OSCAR A. ANDERSON
HAROLD P. FURTH
BY
ATTORNEY.

United States Patent Office 2,997,641
Patented Aug. 22, 1961

2,997,641
PLASMA GENERATOR DEVICE
William R. Baker, Orinda, Oscar A. Anderson, Oakland, and Harold P. Furth, Berkeley, Calif., assignors to the United States of America as represented by the United States Atomic Energy Commission
Filed May 20, 1958, Ser. No. 736,647
8 Claims. (Cl. 322—48)

The present invention relates to means for establishing and maintaining a high energy rotation plasma particularly useful as a fast discharge capacitor and is a continuation in part of my prior patent application for Thermonuclear Reactor, Serial No. 668,271 filed in the United States Patent Office on June 26, 1957.

Although the present invention may be employed in a wide variety of applications and to the end of producing various results, it has been found that particular utility and advantage attaches to the employment of the device hereinafter described as an electrical capacitor for the storage and rapid discharge of very large amounts of electrical energy. Advances in the electrical arts have established the need for means to store and rapidly discharge large quantities of electrical energy, and it has been found that conventional capacitors normally employed for the storage and discharge of electrical energy in conventional circuitry are inadequate to attain the requisite goals. To date there have been employed in such applications extremely large and complicated capacitor banks formed of very many conventional electrical capacitors connected in circuit together with means for simultaneously discharging same through a load. Various disadvantages are attached to this complex arrangement, for the simultaneous discharge of a large number of capacitors is extremely difficult to produce and more specifically it is almost impossible to provide from such a bank of capacitors an output pulse of substantially instantaneous rise time. In other words, the necessary physical distance involved in the multiplication of capacitors unduly complicates the problem of producing an output pulse therefrom having a nearly vertical wave front. This difficulty or limitation of the prior art may be also stated in relation to the physical volume required for the storage of substantially amounts of electrical energy for the dielectric constant of known capacitors places a lower limit on the physical volume required to store large amounts of energy and, consequently, this large volume is extremely difficult to instantaneously discharge. In particular, the solid dielectrics employed in conventional capacitors are capable only of storing a limited amount of electrical energy per unit of volume so that there is thereby imposed a material limitation on the resultant storage characteristics of capacitors employing such dielectrics.

As to the applicability of electrical capacitors capable of producing results beyond those available from conventional capacitors, reference is made to the field of thermonuclear reactions and to the devices developed therein, wherein it is required that extremely large amount of electrical energy be available for substantially instantaneous discharge. Of a more general applicability is the instance of the establishment of very sharply rising magnetic fields of extreme intensity wherein very large current surges must be employed through magnet windings with such current surge having an extremely short rise time to a maximum value. Although various other applications of large capacity rapidly discharging electrical capacitors will be apparent to those skilled in the art, the foregoing clearly establishes at least certain circumstances wherein conventional capacitors are inadequate to the accomplishment of circuit requirements.

The present invention employs an entirely different approach to the problem of storing and discharging electrical energy for herein it is contemplated that electrical energy shall be stored in a plasma discharge and shall be available in the rotational energy of such a plasma. In the present instance, the dielectric material of the resultant capacitor will be seen to be a plasma formed of positive and negative charged particles of substantially equal amounts and constituting a space charge neutralized fully ionized gas, or in other words, a plasma. The utilization of a plasma as the dielectric material of a capacitor overcomes the above-noted difficulties of conventional capacitors particularly in regards the limitation of energy storage per unit volume and as regards the overall size of the resultant capacitor. Of particular interest in the present invention is the fact that the mechanical limit thereof as determined by the electromagnetic pressures is actually encountered before the point of electrical breakdown, quite contrary to conventional capacitors, and further discussed below.

The present invention employs what may be termed a homopolar geometry wherein a radial electric field and an axial magnetic field are employed to set a plasma into azimuthal drift motion. A transient radial current flows during the acceleration period and this current is herein employed to pinch the plasma axially away from the surrounding envelope. The axial magnetic field employed is generally of the magnetic mirror type or at least a magnetic mirror field configuration results from the operation of the apparatus. In this geometry the centrifugal force associated with plasma rotation tends to hold the ions away from the axis and therefore traps them together with the electrons forming the plasma in a region of bulging magnetic field wherein a substantially stable plasma containment is achieved.

In a rotating plasma system as herein contemplated, the application of orthogonally applied electrical and magnetic fields produces a particle drift with a velocity normal to both fields and also causes a particle displacement over a limited distance along the direction of the electric field. This causes a finite opposite displacement of positive and negative charges just as in an ordinary dielectric material whereby the rotating plasma may be employed as a dielectric material having a determinable dielectric constant. The present invention operates to produce such a rotating plasma and to employ same as the dielectric material in a high energy capacitor.

It is accordingly an object of the present invention to provide means for rotating a plasma by the application of orthogonal magnetic and electric fields to the end of increasing the plasma energy and enhancing the containment thereof.

It is another object of the present invention to generate a disc of plasma in an area of crossed electric and magnetic fields for establishing an azimuthal rotation or motion of the plasma together with an increase in the energy thereof to the end establishing a confined plasma of extremely high energy.

It is a further object of the present invention to provide an electrical capacitor wherein the dielectric material is composed of a plasma.

It is yet another object of the present invention to provide a capacitor with a plasma particle dielectric material of very high dielectric constant.

It is a still further object of the present invention to provide a capacitor of extremely rapid discharge time and very large energy storage capabilities employing a rotating plasma wherein energy is stored in the form of plasma momentum.

Figure 1:
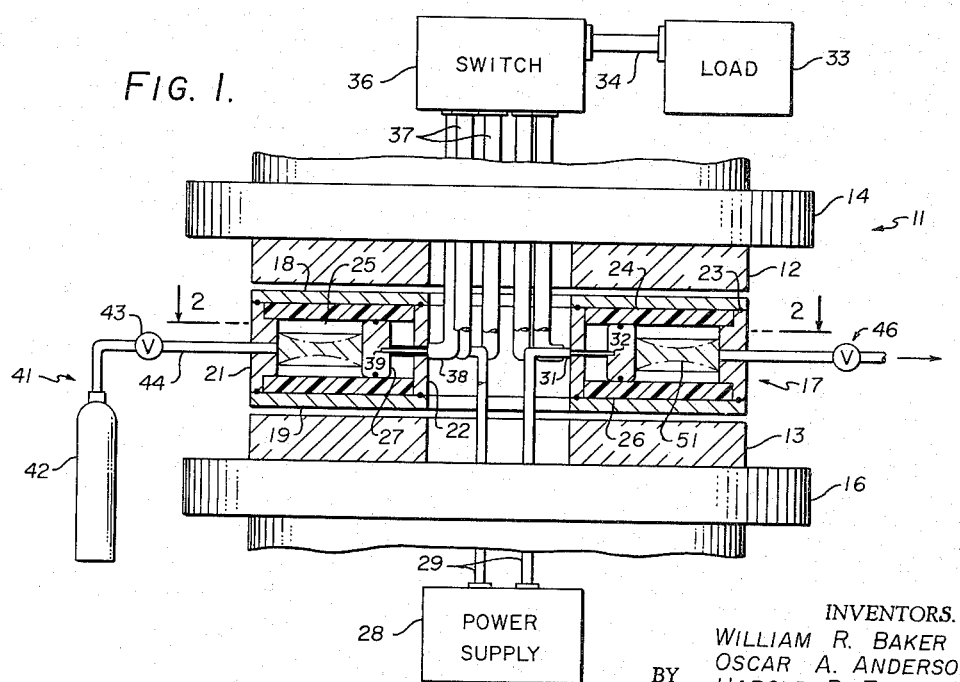

Various other possible objects of the invention together with numerous advantages attaching thereto will become apparent to those skilled in the art from the following description taken together with the accompanying drawings, wherein:

FIGURE 1 is a central vertical sectional view of a preferred embodiment of the present invention; and FIGURE 2 is a transfer sectional view taken in the plane 2—2 of FIGURE 1.

Although substantial theory is involved in a complete consideration of the present invention, particularly as regards the operation thereof, such theoretical considerations may be best understood with reference to a particular structural configuration and thus attention is first invited to the accompanying drawings wherein there will be seen to be provided a magnet 11 comprising a pair of angular spaced apart pole faces 12 and 13 connected to suitable energizing coils 14 and 16, respectively. An annular housing or envelope 17 is disposed coaxially with and intermediate the magnet pole pieces 12 and 13. This annular envelope 17 may be composed of a pair of like upper and lower plates 18 and 19 of annular configuration connected by a cylindrical outer wall 21 and a cylindrical inner wall 22. The envelope elements aforementioned are formed of electrically conducting material and are disposed in electrical contact with each other. Furthermore, the housing or envelope elements are connected in vacuum tight relationship as by means of appropriate resilient means 23 disposed intermediate the separate elements, while suitable mounting means, not shown, are provided to dispose the envelope 17 out of electrical contact with the pole pieces 12 and 13 and yet in close proximity to each. Within the envelope 17 there are disposed upper and lower insulating sheets 24 and 26, respectively, immediately adjacent the upper and lower envelope plates 18 and 19. Within the envelope 17 there is also provided a central annular electrode 27 spaced radially inward from the outer envelope cylinder 21 and extending between the insulating sheets 24 and 26. A plasma chamber 25 is defined in the envelope 17 between the inner electrode 27 and outer wall 21.

Provision is made in the present invention for applying an electrical potential between the inner electrode 27 and the outer envelope cylinder 21 which thereby serves also as an outer electrode. This electrical energization of the aforementioned portions of the described device may be accomplished from a conventional pulsed power supply 28, having a plurality of electrical leads such as coaxial cables 29 extending therefrom through one of the magnet coils 16 into the central opening defined within the magnet pole 13 and envelope 17. The coaxial cables 29 extending within the central opening of the envelope 17 are therein directed radially outward to engage the envelope at equally spaced points about the inner circumference thereof. As regards this engagement of coaxial cables and envelope 17 it is herein preferred that the cable 29 have the outer conductor 31 thereof electrically connected to the envelope at the inner cylinder wall 22 thereof with the inner electrical conductor 32 of the cable extending in insulated relationship through this inner wall 22 into electrical connection with the inner electrode 27 within the envelope 17. A convenient polarity choice in the energization of the elements of this invention is accomplished by the electrical grounding of the external conductor 31 of the power supply 28 and the maintenance of the internal conductor at a high electrical potential thereto, either positive or negative. It will be appreciated that owing to the electrical connection of the plates 18 and 19 and inner and outer cylinders 22 and 21 of the housing or envelope 17, there is applied by the conductor 29 a potential difference between the inner electrode 27 and outer electrode 21 wherein it is possible to establish under conditions discussed below an arc discharge between these electrodes.

Further to the electrical connections of the present invention, there are herein provided means for removing power from the above-described device and such power is delivered to an electrical load 33 connected by a conductor, such as a coaxial cable 34, to a switch 36. This switch 36 is in turn electrically connected across or between the electrodes 27 and 21 of the plasma device and such connection may be accomplished by means of a plurality of coaxial output cables 37 extending from the switch 36 through the center of the magnet coil 14 and into the opening defined within the annular envelope 17 whereat these coaxial output cables 37 extend radially outward to equal spaced points about the inner circumference of the envelope 17. Similar to the input connections described above, each of the output cables 37 has the outer conductor 38 thereof electrically connected to the inner cylindrical wall 22 of the envelope 17 with the central conductor 39 extending through this wall in insulated relationship thereto and into electrical contact with the inner electrode 27 of the device. In the illustrated embodiment of this invention a material difference exists between the input cables 29 and output cables 37 for reasons to be later discussed, and such difference consists of a substantial variation between the cable impedance. Thus the input cables 29 are high impedance cables while the output cables 37 have a very low impedance. Also, it is desirable to the end of facilitating discharge of the capacitor to provide a relatively large number of output cables connected at spaced points about the inner circumference of the device, while suitable energization of the device from the power supply 28 may be accomplished with a relatively few input cables.

In addition to the foregoing, there is provided means for introducing a gas within the envelope 17 wherein such gas is ionized to form a plasma. Although innumerable suitable gas sources are available, there is herein illustrated as a gas source 41, a gas bottle 42 connected through a valve 43 to an output line 44 that extends through some convenient portion of the envelope 17 to provide gas therein and in actual practice it is preferable to provide a plurality of branches to the gas input line 44 to the end of introducing gas at spaced points about the circumference of the envelope 17. While various gases are suitable for utilization in the present invention and the choice of particular gas to be employed is dependent at least in part upon the particular application of the invention it has been found at least suitable to utilize argon as a gas to be ionized within the envelope when the invention is to be utilized as a capacitor. Suitable envelope evacuation means are provided and there is shown in the drawing a pump-out connection 46 connected to the envelope 17 for evacuating the envelope by suitable pumping means, not shown.

Operation of the present invention is accomplished by first evacuating the plasma chamber 25 by means of the pump-out connection 46 to reduce the pressure within the chamber to relatively low value. Suitable gas is then introduced into the chamber 25 from the gas source 41 and the power supply 28 is pulsed by control means herein assumed to be integral therewith to apply thereby a high voltage pulse between the inner and outer electrodes 27 and 21 defining the plasma chamber 25. This applied electrical voltage establishes a radial electric field within the plasma chamber 25 and thereby accelerates electrons and ions naturally occurring in gaseous atmospheres, such that these charged particles move and consequently suffer ionizing collisions with other neutral particles within the chamber. This ionizing process is cumulative so that there is rapidly formed within the plasma chamber a high intensity arc discharge initially extending radially outward from the inner electrode 27 to the outer electrode 21. This arc discharge comprises a plasma formed of substantially equal numbers of electrons and positively charged ions to produce space charge neutralization such that the resultant plasma is substantially electrically neutral. This plasma established between the electrodes 21 and 27 by the electrical energization thereof from the power supply 28 produces by the motion of charged particles therein a self-induced magnetic field tending to constrict the plasma in a vertical direction such that the resultant plasma is compressed away from the upper and lower boundaries of the plasma chamber as defined by the insulating discs 24 and 26 and the plasma then takes somewhat the form as illustrated at 51 of FIGURE 1. This plasma compression is accomplished by the net current flow radially of the plasma chamber brought about by the initial motion of ions and electrons in opposite radial directions and is often termed the "pinch effect" treated elsewhere in the literature.

In addition to the foregoing effects operating upon the discharge within the chamber 25 there is further to be considered the axial magnetic field established between the pole faces 12 and 13 of the apparatus and directed initially generally axially through the plasma chamber 25. At least two separately identifiable effects of this axially magnetic field are present and one of these will be seen to relate to the radial containment of plasma 51. Thus as the plasma 51 attains substantial density there is produced a condition wherein magnetic fields tend to prefer to pass outside of same. The properties of plasma in this respect are known in the art and may be summarized by the statement that magnetic fields tend to be excluded from a high density plasma. The consequence of this effect in the present instance is that the magnetic field is bowed between the pole faces 12 and 13 and is, in fact, extended radially outward much in the manner of stretched rubber bands by the plasma 51 so as to tend to curve about the exterior circumference of the plasma whereas the resultant magnetic field has a substantially increased intensity over that to be found radially inward therefrom. This magnetic field configuration is similar to that found in so-called "magnetic mirrors," wherein the properties of magnetic fields of increasing intensities are known to repel charged particles. Thus there is produced within the plasma chamber 25 a peripheral magnetic mirror which urges the plasma away from the outer electrode 21 and thereby tends to contain the plasma within the chamber and to materially reduce radial electric currents in the plasma from reaching the electrode 21. An initial magnetic mirror field may be provided by tapering of the pole pieces 12 and 13 radially inward thereof. The second above-mentioned effect of the axial magnetic field is to impose an additional force upon the charge particles comprising the plasma 51 for it is well known that charged particles traversing a magnetic field at right angles to the lines of force thereof are acted upon by a resultant force at right angles to both the magnetic field and the direction of travel of the charged particles. Thus in the present instance wherein there is applied orthogonal electric and magnetic fields the charged particles initially traversing the electric field lines are acted upon by the orthogonally disposed magnetic field lines to be thereby forced into a direction of motion normal to each of the field lines and in the present instance it will be seen that such direction of motion is circumferential of the plasma chamber 25. There is thus produced in the plasma 51 a motion of charged particles circumferentially about or azimuthally about the chamber 25. As a consequence of this motion, the resultant plasma disc 51 rotates generally about the axis thereof and will thereby be seen to be analogous to an electric generator wherein a conductor rotates in a magnetic field. As a consequence of this rotation of the plasma in the magnetic field there are generated within the plasma electric currents also directed in an azimuthal direction. From the foregoing, it will be seen that there is established in the plasma chamber of the present invention a rotating disc of high density plasma; however, further effects are of particular importance as regards the properties of this rotating disc.

It will be appreciated that inasmuch as plasma extends generally radially outward from the central electrode about the circumference thereof generally to the surrounding outer electrode 21, the plasma current density must be greatest adjacent the inner electrode inasmuch as the same current reaches the outer electrode as leaves the inner electrode, under simplified conditions. This greater current density adjacent the inner electrode results in a greater angular acceleration of the plasma thereat and it will be seen that owing to the particular homopolar geometry herein employed there is applied to the plasma disc rotational forces of varying intensity over the radius thereof such that there is produced a consequent increased probability of ion collisions within the plasma, and it is well known that such collisions thereby increase the plasma temperature or relative plasma energy. The present invention does not depend entirely upon the conventional joule heating, but instead utilizes what may be termed viscous heating. In explanation thereof, reference is made to the well-known Larmor radii effects, wherein ions are caused to traverse cycloidal paths in crossed electric and magnetic fields, and in the present invention this Larmor radius is preferably made sufficiently small that in the traverse about the circumference of the plasma an ion accomplishes a relatively large plurality of cycloidal revolutions. This is herein maximized by the utilization of rapidly rising electric fields applied to the electrodes of the invention wherein the Larmor effect is maximized and the resultant probability of ion-ion collisions is thus also maximized.

In addition to the plasma heating effects briefly discussed above, the plasma containment effects of the present invention about the outer periphery of the plasma chamber 25 serves to radially contain the plasma, at least to a substantial degree. Additionally, it will be appreciated that should the plasma disc attempt to tip, the charged particles of the plasma would then pass through unequal fields in their traverse about the plasma chamber so as to be acted upon by magnetic forces urging them to return to a central orbital position. Additionally also, is the axial containment of the present invention for herein the difficulties of magnetic mirror confinement are not encountered inasmuch as there is herein established a rotating disc of plasma such that the plasma disc generates its own axially constricting magnetic field, and there is not associated with the present invention the "escape cone" normally found with magnetic mirror machines. This axial confinement is even further herein enhanced by the utilization of the upper and lower chamber plates 18 and 19 as return current paths such that there is induced immediately adjacent the surfaces thereof relatively strong magnetic fields which tend to repel charged particles approaching the chamber walls. As a result of this materially improved containment of the present invention, it is possible to maintain the plasma in rotation for a substantial period following termination of the energizing pulse and this prolonged containment of the plasma has been measured and found to be in excess of 100 microsecond duration. The consequence of this prolonged plasma containment following termination of the rapidly rising electric energizing field is to provide additional time for thermalization of the plasma particles to the end of increasing the temperature or energy thereof. This extended plasma containment is also in part dependent upon the fact that charged particles in the plasma rotating therein or traveling generally azimuthal paths therein are operated upon by centrifugal forces tending to urge same radially outward and that this radial motion establishes a further generator action by the equivalent of a conductor cutting magnetic lines of force. As a result of this action there is established an azimuthal current producing a force in opposition to the force producing the current, and this current operates to confine the plasma about its colloidal periphery.

From the foregoing it will be appreciated that there is established within the present invention an extremely high energy, high density plasma of substantial containment characteristics and it will be seen to follow therefrom that this plasma then comprises an energy sink or reservoir which is available for a multitude of applications including that of energizing an external circuit. A particularly advantageous application of the present invention is herein contemplated in the provision of means for discharging this electrical energy from the plasma chamber into an external circuit to produce a very large pulse of electrical energy having an extremely rapid rise time in the wave form thereof.

When an electric field is applied to a plasma with included orthogonal magnetic field, particles are given a drift velocity orthogonal to both fields and are also displaced over a limited distance in the direction of the electric field. The particles assume equilibrium orbits of various types; however, in any case there is a finite opposite displacement of positive and negative charges just as in ordinary dielectric material. As has been pointed out by Spitzer in Physics of Fully Ionized Gases, there may be derived from the equation of motion an equation for a polarizable medium with a polarizability equal to the mass density $\rho$ divided by the square of the magnetic field strength H. In this instance the dielectric constant K may then be determined from the relation $$K = 1 + \frac{4\pi\rho c^2}{H^2}$$

wherein $c$ is the velocity of light and H is the intensity of the magnetic field. The same result may be obtained by ascribing the drift energy of the plasma to the electric field.

Proceeding further with the capacitance characteristics of the present invention, it will be seen that the kinetic energy of the rotating plasma is the analog of the quantity $\frac{1}{2} CV^2$ for an ordinary capacity wherein C is the charge and V is the voltage. Another integral of the motion, the plasma angular momentum $P_\theta$ may be readily seen to be the analog of the capacitor charge Q which is equal to CV and this is readily established by considering that the torque impulse on the plasma must equal the angular momentum imparted thereto, or $$P_\theta = 2\pi l H_z \int dt \int i_r r^2 dr$$

where $l$ is the length of the device, $H_z$ is the axial magnetic field, $i_r$ is the radial current flow and $r$ is the radius of the device. Substituting in the foregoing, the relationship that $$i_r = \frac{I}{2\pi r l}$$

wherein I is the total current and the common relationship $Q = \int I dt$, produces the resultant relationship $$P_\theta = \frac{1}{2\pi} HAQ$$

wherein A is the plasma disc area, $2\pi \int r dr$. Although difficulties may be encountered in the utilization of the present invention as a capacitor owing to the possible formation of anode sheaths wherein a plurality of electrons form a sheath about the anode, this is herein precluded by the application of a rapidly rising energizing voltage wherein the acceleration time of the plasma is less than the electron collision time. Randomizing collisions are thereby produced between electrons and heavy particles (ions and neutrals) allowing electrons to drift toward the anode, and this type of current tends to discharge the anode sheath.

In actual operaton of the present invention and in addition to the above-described generation of a high density, high energy rotating plasma within the chamber 25, there is additionally employed the switch 36 which is preferably electronically controlled to connect the load 33 across the plasma. The output cables 37, as previously noted, have a very low impedance so that upon closing of the switch 36 to connect the load 33 across the plasma 51 the discharge path through the load has a much lower impedance than the charging path through the high impedance input cable 29 and consequently the plasma energy is instantaneously dumped into the load 33. In this manner it is not necessary to utilize switching means in the input lines 29 for the current flow from the plasma will preferentially follow the lower impedance path through the load rather than attempting to return through the power supply 28. In the present invention, the relatively small plasma disc 51 is raised to an extremely high energy level so that there is concentrated a very large amount of electrical power in a very small physical area, and furthermore the overall device of the present invention is quite small so that it is possible to locate same immediately adjacent whatsoever load is desired to be energized thereby, and consequently normal difficulties of capacitor discharge are obviated by the present invention.

It is often stated that the amount of capacitor energy that can be delivered to any point in a given time interval is limited by the attainable dielectric constant of the capacitor storing the energy. This statement is based upon the fact that the tolerable electric field in a condenser or transmission line is limited to a certain maximum voltage $E_{max}$ and therefore the maximum energy density $u$ in a medium having a dielectric constant K may be stated as $$u = \frac{E_{max}^2 K}{8\pi}$$

It may be shown that the propagation velocity $v_s$ in such a medium is $$v_s = \frac{C}{\sqrt{K}}$$

so that the maximum energy that can be delivered in a time $t$ to a load having a cross section A is $$u = \sqrt{K} \frac{ctAE_{max}}{8\pi}$$

It is thus apparent that a large value for the dielectric constant is highly desirable and such is herein attained. Furthermore, it may be determined that the common practice of matching the transmission line impedance and the capacitor impedance is not practical for large values of the dielectric constant K, for such condition results in an over voltaging of the transmission line and, consequently there is herein employed a mis-matched transmission line comprising the output cables 37. Although such condition is normally considered disadvantageous inasmuch as it would normally tend to increase the discharge time involved, in the present invention wherein the capacitor length is substantially greater than the transmission length no appreciable increase in discharge time results and one of the prime goals of practical capacitor design is fulfilled. Also in the present invention, consideration is given to the practical maximum value of the dielectric constant for herein it is possible to provide a dielectric constant of enormous value, such for example $5 \times 10^7$. It will be evident from the above-noted propagation velocity relationship that excessive dielectric constant values will unduly limit the propagation velocity. It will be seen from the above relationships that with a discharge time of 0.1 microsecond or so a value of K as large as $5 \times 10^7$ would imply a capacitor length in the range of a few millimeters and inasmuch as this is not herein contemplated it is preferable to choose a dielectric constant value in the general range of $10^6$ which also happens to be a natural operating point for the present invention.

Theoretically, instabilities may be possible when the energy density of the rotating plasma becomes comparable to that of the magnetic field and it appears that the invention may fail to attain maximum capacitor characteristics when the plasma energy density approaches about one-half that of the field energy. Considering that the magnetic field of the invention may have a strength of about $10^5$ gauss, there would then be produced a plasma energy density of about 20 joules per cubic centimeter. For the dielectric constant K equal to $10^6$ there would thus then be obtained a maximum voltage of only about 20 kilovolts per centimeter which is readily utilized in conventional equipment.

As an example there may be considered as a practical design for a capacitor constructed in accordance with the present invention a homopolar geometry as above discussed wherein it is desired to obtain a discharge time of 0.1 microsecond. With a choice of a dielectric constant K equal to $10^6$ there would then be required an allowable capacitor length of a few centimeters which is quite practical in the present invention. This value of K equals to $10^6$ is readily achieved for $H=100,000$ gauss and a hydrogen density of $5 \times 10^{16}$ per cubic centimeter wherein there is employed as the gas within the device hydrogen or various isotopes thereof. With the electric field of the device limited to about 20 kilovolts per centimeter, the transmission line may be electrically limited. The transmission line spacing can be taken as an order of magnitude smaller than the capacitor spacing thus effectively dispelling transmission line losses even for transmission lines of 10 centimeters or so in length. Even under these conditions the electrostatic energy density in the transmission line is still four orders of magnitude smaller than in the source or in the capacitor so that no undue requirements or criteria are imposed upon transmission lines to be utilized with the present invention. In practice it will be found that the homopolar geometry of the present invention is similar to a coaxial transmission line out of which energy is drawn at both ends; therefore, a typical device could be five centimeters long and for operation at 200,000 volts the spacing between the inner and outer electrodes would be 10 centimeters. With an inside radius of about 10 centimeters a total energy of $10^5$ joules could thus be delivered in 0.1 microsecond and this would necessarily produce a current of quite a few megaamperes.

From the foregoing and particularly the example given above, it will be seen that the present invention is far advanced over any known capacitor insofar as high energy rapid discharge time is concerned. It will of course be appreciated that the particularly advantageous applicability of the present invention lies in the field of high energy discharge. Very rapid discharge for the associated elements including the magnetic field do not lend themselves readily to the utilization of this device for extremely small power applications, although a wide latitude in power requirements is possible with the present invention while yet retaining a practical and economical device.

What we claim is:

1. A rotating plasma device comprising an evacuated annular chamber defined by electrodes spaced radially apart with the facing surfaces thereof everywhere radially equidistant, means introducing a gas at a fraction of atmospheric pressure within said chamber for ionization, means applying a high potential between said electrodes for establishing an arc discharge within said chamber, means establishing a magnetic field axially through the chamber for imparting a rotational motion to said arc discharge whereby there is formed within said chamber a rotating disc of plasma.

2. Energy storage means comprising a pair of concentric electrodes with facing surfaces thereof everywhere radially equidistant, means connecting said electrodes for defining an evacuated annular chamber therebetween, means maintaining a low pressure gaseous atmosphere significantly below atmospheric pressure within said annular chamber, power supply means connected between said electrodes for energizing same to establish a high intensity arc discharge within said chamber whereby said discharge produces a self-induced magnetic field restraining the discharge into a disc configuration, and means establishing a magnetic field axially through said chamber for imparting an azimuthal velocity to charge particles forming said disc whereby same rotates within said chamber to store energy in the angular momentum of the charged particles.

3. A plasma capacitor comprising a pair of concentric electrodes, insulating means connecting said electrodes to define therewith an annular plasma chamber, means introducing a low pressure gas into said chamber for ionization therein, an input line connected between said electrodes, power supply means connected to said input line and applying between said electrodes a high intensity electrical field for ionizing gas within said chamber and establishing a plasma therein whereby said plasma produces a self-induced magnetic field constraining the plasma axially of the chamber into a disc extending substantially between said electrodes, means establishing a magnetic field axially through said chamber for applying a force to the charge particles of said plasma whereby said plasma rotates azimuthally of said chamber, and a plurality of output cables connected between said electrodes at a plurality of equally spaced points thereabout and defining an output transmission line of substantially lower impedance than said input line.

4. An improved capacitor comprising high impedance input line, a low impedance output line, a pair of electrodes defining a chamber and connected between the input line and output line, and means establishing between the electrodes within said chamber a high intensity rotating disc of plasma having a high dielectric constant for the storage of large amounts of electrical energy.

5. An improved capacitor comprising means defining an annular chamber and including a pair of radially spaced electrodes about said chamber, an input line connected between the electrodes of said chamber and having a high impedance, an output line connected between the electrodes of said chamber and having a low impedance, means establishing a magnetic field through said chamber substantially axially thereof out of alignment with said electrodes, and means introducing a gas to be ionized at a low pressure within said chamber whereby application of electrical energy between said electrodes through said input line establishing within said chamber a high intensity rotating plasma having a high dielectric constant and capable of storing for short time intervals large amounts of electrical power for discharge through said output line.

6. Energy storage means according to claim 2, further defined by said magnetic field axially through the chamber being of an intensity commensurate with the establishment of a sufficiently small Larmor radius of said charged particles forming the disk that the particles traverse a large plurality of cycloidal revolutions within the disk during rotation thereof.

7. A rotating plasma device comprising means establishing an annulus of high intensity plasma subjected to a pressure at a small fraction of atmospheric pressure and having a radial current flow therein to thereby establish a self-constricting magnetic field laterally compressing the plasma to maximize plasma density, and magnetic field means establishing a magnetic field through the annulus of plasma substantially normal thereto for deflecting plasma particles in a direction productive of azimuthal orbital particle motion in the plasma annulus to thereby cause the annulus to rotate.

8. A rotating plasma device for storing energy comprising an electrically conductive closed annular housing evacuated to a pressure substantially below one-hundredth of atmospheric pressure, an annular electrode disposed within said evacuated housing in insulated relation thereto and spaced radially inward from the outer cylindrical wall with the facing surfaces of said electrode and said outer cylindrical wall being everywhere radially equidistant, means introducing a gas within said housing for ionization, means impressing a high potential between said housing and said electrode to establish an arc discharge radially of said housing including an annular plasma, the end walls of said housing being return paths for the discharge current with the current thereby inducing strong magnetic fields adjacent the surfaces of the end walls to repel charged particles of the plasma therefrom, and magnetic field means establishing a magnetic field axially through the chamber for imparting a rotational motion to the annular plasma of the discharge whereby a rotating disk of plasma is formed within said housing.

References Cited in the file of this patent

UNITED STATES PATENTS

| | | |
|---|---|---|
| 930,212 | Mosciki | Aug. 3, 1909 |
| 2,629,050 | Peters | Feb. 17, 1953 |
| 2,759,138 | Andrews | Aug. 14, 1956 |